(12) United States Patent
Agarwal

(10) Patent No.: US 7,450,664 B2
(45) Date of Patent: Nov. 11, 2008

(54) SELECTION OF TRANSMISSION ALPHABET SETS FOR SHORT MESSAGE SERVICES

(75) Inventor: Prashant Agarwal, Berkshire (GB)

(73) Assignee: NEC Corporation, Tokyo (JP)

( * ) Notice: Subject to any disclaimer, the term of this patent is extended or adjusted under 35 U.S.C. 154(b) by 843 days.

(21) Appl. No.: 10/640,149

(22) Filed: Aug. 13, 2003

(65) Prior Publication Data

US 2004/0034693 A1 Feb. 19, 2004

(30) Foreign Application Priority Data

Aug. 14, 2002 (GB) ................................ 0218915.7

(51) Int. Cl.
*H03K 9/00* (2006.01)
*H04L 12/58* (2006.01)

(52) U.S. Cl. ................. 375/316; 455/412.1; 455/432.1; 455/432.2; 455/432.3

(58) Field of Classification Search ................. 370/466; 455/412.1, 414.1–4, 412, 432; 375/295, 375/316
See application file for complete search history.

(56) References Cited

U.S. PATENT DOCUMENTS

| | | | |
|---|---|---|---|
| 5,519,443 A | 5/1996 | Salomon et al. | |
| 6,389,064 B1 | 5/2002 | Dholakia et al. | |
| 6,810,262 B2 * | 10/2004 | Kim | 455/466 |
| 6,920,331 B1 * | 7/2005 | Sim et al. | 455/466 |
| 7,016,670 B2 * | 3/2006 | Agin | 455/423 |
| 7,167,703 B2 * | 1/2007 | Graham et al. | 455/415 |
| 2004/0008723 A1 * | 1/2004 | Uchida et al. | 370/466 |
| 2005/0120305 A1 * | 6/2005 | Engstrom et al. | 715/760 |
| 2005/0180392 A1 * | 8/2005 | Watkins | 370/352 |
| 2006/0203924 A1 * | 9/2006 | Casaccia et al. | 375/260 |

FOREIGN PATENT DOCUMENTS

| JP | 9-191482 | 7/1997 |
|---|---|---|
| JP | 10-190863 | 7/1998 |

* cited by examiner

*Primary Examiner*—Chieh M. Fan
*Assistant Examiner*—Jason M. Perilla
(74) *Attorney, Agent, or Firm*—Scully, Scott, Murphy & Presser, P.C.

(57) ABSTRACT

A receiver for text messages in a network includes a means to receive and demodulate a signal. A message type detector determines whether or not the message is a text message. If it is, a header decoder looks at the header of the text message for encoding information. An alphabet selector then selects an appropriate decoding alphabet from an alphabet memory to be used by a message decoder prior to display the text message on a display.

6 Claims, 1 Drawing Sheet

SELECTION OF TRANSMISSION ALPHABET SETS FOR SHORT MESSAGE SERVICES

BACKGROUND OF THE INVENTION

1. Field of the Invention

Figure 1:
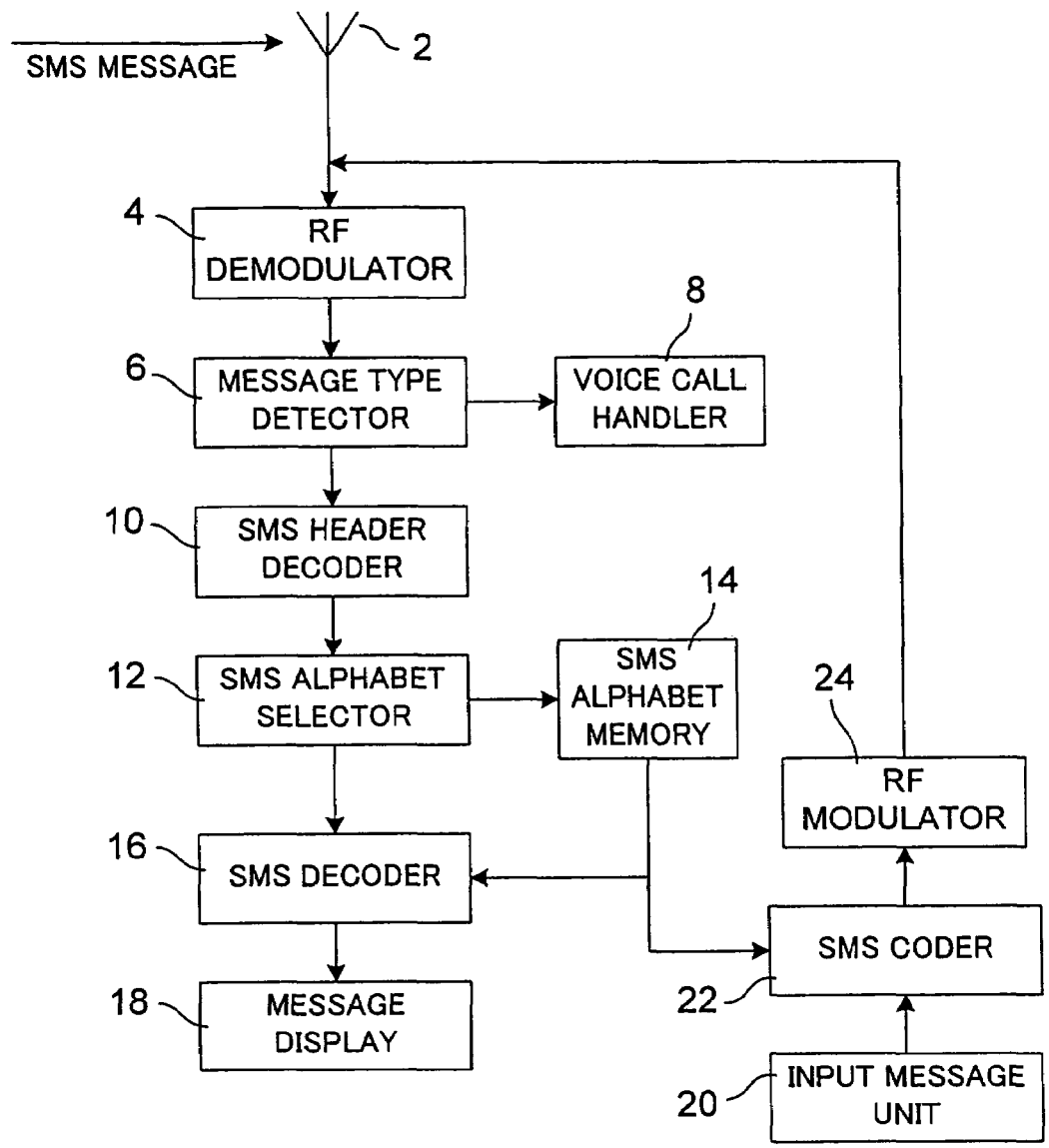

This invention relates to an apparatus and a method used in text message communications such as SMS (Short Message Service) messages, and more particularly to the selection of coding data sets for use in transmission of messages in such an apparatus and a method.

2. Description of the Related Arts

Short message service transmissions have become increasingly popular over the last few years as the use of mobile telephones and other handheld devices has increased. Short message service transmissions can now also be made from other portable devices, from telephones connected to landlines, and from personal computers. It is expected that their use will continue to increase.

An SMS message is typically input to a terminal device such as a cellular phone by a user using the keypad of that device. Once the message has been input, a recipient is selected and the message is transmitted from the device to the recipient via one or more communication networks.

There are a number of communication formats known as alphabets or coding data sets which are used for transmission. These alphabets are used for coding the characters used in a message to be transmitted. The most basic of these alphabets is the GSM (Global System for Mobile communication) 7-bit default alphabet. This is capable of supporting a total of 256 different characters, thus it has sufficient characters for the standard 26-bit English alphabet, numerals 0 to 9, and various foreign language special characters and characters with accents.

A more sophisticated alphabet for transmission is an 8-bit alphabet which allows a total of 512 different characters to be transmitted. Beyond this, there is now available the UCS2 16-bit alphabet which permits a total 131,072 different characters to be transmitted.

In most countries a number of different networks support SMS messaging using one or more of the available alphabet sets. Where a messaging terminal device is supplied by a network provider it is usual for that device to support the SMS alphabet of that provider, however, as people travel more frequently, mobile devices are required to operate across a plurality of different networks. This can result in SMS messaging not being available to users when their devices are connected to certain networks.

SUMMARY OF THE INVENTION

An object of the present invention is to provide a device which can use short massage service in different communication networks.

Another object of the present invention is to provide a method which makes a user possible to use short massage service in different communication networks.

The first object of the present invention is achieved by an apparatus for receiving text messages in a network which comprises means to receive and demodulate a message, means to detect a type of the message received, means responsive to a received text message to determine an coding data set which has been used to encode the received text message, means for selecting a coding data set from a local coding data memory for decoding the received text message, means for decoding the received text message, and means for displaying the decoded message.

According to the present invention, the text message typically comprises a short message service message. The decoding data set is a data set which is used for decoding the text message, and is generally called a character code set or alphabet or a alphabet set.

In accordance with an embodiment of the present invention there is provided an SMS messaging terminal including means to receive an SMS message, means for detailing the SMS alphabet used by the received SMS message, means for selecting the detected SMS alphabet from a plurality of stored SMS alphabets, and means for decoding the received SMS message using the selected SMS alphabet.

The second object of the present invention is achieved by a method for receiving text messages in a network which comprises the steps of receiving and demodulating a message, detecting a type of message received, determining a coding data set used to encode the received message, selecting the determined coding data set from a local coding data memory, decoding the message, and displaying the message.

The invention is defined with more precision in the appended claims to which reference should now be made.

BRIEF DESCRIPTIONS OF THE INVENTION

A preferred embodiment of the invention will now be described in detail by way of example with reference to the accompanying drawing in which:

FIG. 1 shows a block diagram of circuitry embodying the present invention for use at an SMS terminal.

DETAILED DESCRIPTION OF THE INVENTION

In FIG. 1, an SMS communication terminal device includes: an antenna 2 for receiving various messages transmitted over the air as an RF signal; an RF demodulator 4 for demodulating the received RF signal to delivery the received message; a message type detector 6 which is arranged at an output of the RF demodulator 4 and detects the type of the received message; a voice call handler 8 which processes a voice call when the type of message is a voice call; an SMS header decoder 10 for decoding information included in a header of the received message when the type of message is a text message, i.e., an SMS message; an SMS alphabet memory 14 for storing data which is used for encoding an SMS message with one of various alphabets and decoding an SMS message encoded with such an alphabet; an SMS alphabet selector 12 for selecting an alphabet from the SMS alphabet memory 14 for decoding the message based on the detection result at the SMS header decoder 10; an SMS decoder 16 for decoding the SMS message; and a message display 18 for displaying the decoded message. The types of message include, for example, a voice call and a text message. The SMS header decoder 10 identifies an alphabet which has been used for coding an SMS message. Upon decoding the SMS message, the SMS decoder is provided with data for decoding the message with the selected alphabet from the SMS alphabet memory 14.

For transmitting an SMS message, the terminal device further includes: an input message unit 20 for receiving a message from user; an SMS coder 22 for coding the message with the alphabet selected by the SMS alphabet selector 12; and an RF modulator 24 for converting the coded message into an RF signal. The RF signal is transmitted from antenna 2. The SMS coder 22 is supplied with data from the SMS alphabet memory 14 upon coding the message.

In this terminal device, an SMS message is received by the antenna 2. The message then passes to the RF demodulator 4 which demodulates the received message to its basic encoded state. This demodulated signal then passes through the message type detector 6. The message type detector 6 examines the type of message being received. If the message is detected as being a voice call then it is connected to the voice call handler 8 which subsequently deals with all aspects of receiving and communicating on a voice call. This is not relevant to the present application.

If the message is detected as being an SMS message it is then passed to the SMS header decoder 10. The SMS header decoder 10 examines the header received with the SMS message. The header includes information about the alphabet used for coding the SMS message and this information is passed to the SMS alphabet selector 12. In response to this data, the SMS alphabet selector 12 causes the SMS alphabet memory 14 to provide relevant decoding data to the SMS decoder 16. The SMS decoder 16 then decodes the received message using the appropriate SMS alphabet e.g. 7-bit, 8-bit, or 16-bit (or any other alphabet used). The decoded message is then displayed on the message display 18.

The SMS alphabet memory 14 is usually set with a default value, this being the alphabet set with the smallest number of bits. When the terminal device is used in a network which supports this alphabet (e.g., the 7-bit alphabet) then no resetting of the SMS alphabet memory 14 to provide a different alphabet set to the SMS decoder 16 will be required provided all messages are received in the default alphabet set.

If however, a message is received in a different SMS alphabet, e.g., 8-bit or 16-bit, the SMS alphabet selector 12 will cause the SMS alphabet memory 14 to provide decoding data relevant to the alphabet used by the received message to the SMS decoder 16. The received message will then be properly decoded. At the same time, the SMS alphabet selector 12 will change the default alphabet used from the SMS alphabet memory 14 to the alphabet used by the received message.

When a message is to be sent from this terminal device, it is input at the input message unit 20 by a user. The SMS coder 22 then codes the message using the current default SMS alphabet selected by the SMS alphabet selector 12 from the SMS alphabet memory 14. This coding includes the addition of a header to the SMS message which includes the identity of the SMS alphabet used. The coded message then passes to the RF modulator 24 where it is converted to an appropriate RF frequency signal and is transmitted via the antenna 2.

This coding process using the current default of the SMS alphabet memory 14 will continue so long as the device remains operating within the network on which it last received an SMS message and which caused its current default SMS alphabet to be selected.

If the terminal device moves to a new network then network identification information received from the network via the antenna 2 notifies the device of this. The device is arranged to force the SMS alphabet selector 12 to revert to the SMS alphabet with the smallest number of bits from the SMS alphabet memory 14, e.g., 7-bits. This alphabet will then be used initially in the new network. When a message is received in a new network, the alphabet used for this will be detected by the SMS alphabet selector 12 and the appropriate SMS alphabet loaded to the memory. If the first message used by the device in the new network is a message transmitted by the device, then this will be coded using the alphabet with the lowest number of bits, e.g., 7-bits.

The invention can be used in any devices which send texts or SMS messages including mobile telephones, other portable communication devices, telephones attached to landlines, mobile computers, etc.

While preferred embodiments of the present invention have been described using specific terms, such description is for illustrative purposes only, and it is to be understood that changes and variations may be made without departing from the spirit or scope of the following claims.

What is claimed is:

1. An apparatus for receiving text messages in a network, said apparatus comprising:
   means for selecting a coding data set from a local coding data memory for decoding a received text message and, when the apparatus moves into a different network for communication, for selecting a coding data set from the local coding data memory as an initial default coding data set for the network, said initial default alphabet being the same for each different network;
   means to receive and demodulate the received text message;
   means to detect a type of the received text message;
   means responsive to the received text message type to determine a coding data set which has been used to encode the received text message;
   means for decoding the received text message with the determined coding data set; and
   means for displaying the decoded message,
   wherein the means for selecting the coding data set from a local coding memory changes the initial default coding data set for the different network to the determined coding data set for subsequent use in the different network.

2. The apparatus according to claim 1, further comprising means for a sending a message, wherein the determined coding data set from a most recently received text message is used for a next text message to be sent by the apparatus.

3. The apparatus according to claim 1, wherein said initial default coding data set is used for all subsequent transmission of messages from the apparatus until a message is received having a different coding data set.

4. A method for receiving text messages in a network, said method comprising the steps of:
   detecting a movement into a different network for communication;
   selecting an initial default coding data set when the movement into the different network is detected, said initial default coding data set being the same for each different network;
   receiving and demodulating a message;
   detecting a type of the message received;
   determining a coding data set used to encode the received message;
   selecting the determined coding data set from a local coding data memory;
   decoding the message received;
   displaying the decoded message; and
   changing the initial default coding data set to said determined coding data set for subsequent use in the detected different network.

5. The method according to claim 4, further comprising the steps of:
   entering a message as an input message,
   encoding the input message with the selected coding data set; and
   transmitting the encoded message.

6. The method according to claim 4, wherein said initial default coding data set is used for all subsequent transmission of messages until a message is received having a different coding data set.

* * * * *